United States Patent
Bilhan et al.

(10) Patent No.: US 11,132,659 B2
(45) Date of Patent: Sep. 28, 2021

(54) TAMPER DETECTION

(71) Applicant: Texas Instruments Incorporated, Dallas, TX (US)

(72) Inventors: Erkan Bilhan, Dallas, TX (US); Rajitha Padakanti, Plano, TX (US); Amritpal Singh Mundra, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 591 days.

(21) Appl. No.: 14/799,341

(22) Filed: Jul. 14, 2015

(65) Prior Publication Data

US 2017/0017943 A1   Jan. 19, 2017

(51) Int. Cl.
| | |
|---|---|
| G06F 12/14 | (2006.01) |
| G06F 21/86 | (2013.01) |
| G06F 7/58 | (2006.01) |
| G06F 3/02 | (2006.01) |
| G06Q 20/20 | (2012.01) |
| G07F 19/00 | (2006.01) |

(52) U.S. Cl.
CPC ....... *G06Q 20/206* (2013.01); *G07F 19/2055* (2013.01)

(58) Field of Classification Search
CPC ............................ G06F 11/30; G06F 21/572
See application file for complete search history.

(56) References Cited

U.S. PATENT DOCUMENTS

| | | | |
|---|---|---|---|
| 7,343,496 B1 | 3/2008 | Hsiang et al. | |
| 7,953,987 B2 * | 5/2011 | Buscaglia | G06F 21/86 |
| | | | 713/194 |
| 7,953,989 B1 * | 5/2011 | Hsiang | G06F 21/572 |
| | | | 713/194 |
| 8,645,735 B1 * | 2/2014 | Ardis | H04L 9/0866 |
| | | | 713/320 |
| 8,689,357 B2 * | 4/2014 | Arora | G06F 21/755 |
| | | | 726/34 |
| 9,268,972 B2 * | 2/2016 | Prakash | G06F 21/86 |
| 9,418,250 B2 * | 8/2016 | Brooker | G06F 21/87 |
| 2002/0002683 A1 * | 1/2002 | Benson | G06F 21/87 |
| | | | 713/194 |
| 2003/0179714 A1 * | 9/2003 | Gilgenbach | H04L 67/26 |
| | | | 370/252 |
| 2004/0123116 A1 * | 6/2004 | Jin | G06F 21/552 |
| | | | 713/187 |
| 2004/0199573 A1 * | 10/2004 | Schwartz | G05B 23/0286 |
| | | | 709/201 |
| 2006/0135208 A1 | 6/2006 | Lee | |
| 2008/0164320 A1 * | 7/2008 | Garrido-Gadea | G08B 13/128 |
| | | | 235/486 |

(Continued)

FOREIGN PATENT DOCUMENTS

CN   1794852   6/2006

OTHER PUBLICATIONS

Chinese Office Action for CN 201610556888.6 dated Oct. 13, 2020.

*Primary Examiner* — Talia F Crawley
(74) *Attorney, Agent, or Firm* — Brian D. Graham; Charles A. Brill; Frank D. Cimino

(57) ABSTRACT

A financial transaction system includes sensors, a tamper detection module, and circuitry configurable to control which sensors are used, and the circuitry is configurable after the tamper detection module has been manufactured.

18 Claims, 2 Drawing Sheets

(56) References Cited

U.S. PATENT DOCUMENTS

| | | | | |
|---|---|---|---|---|
| 2008/0278353 A1* | 11/2008 | Smith | ............... | G06F 21/86 341/22 |
| 2012/0305648 A1* | 12/2012 | Sondhi | ............ | G06Q 20/325 235/441 |
| 2014/0368345 A1* | 12/2014 | Dobbins | ............ | E05G 1/005 340/568.7 |
| 2016/0043914 A1* | 2/2016 | Taranath | ............ | H04L 43/16 709/224 |

* cited by examiner

TAMPER DETECTION

BACKGROUND

Financial transaction systems are systems used to electronically transfer financial information. Examples include systems for processing payments, such as credit card or debit card payments, or payments initiated by a smart phone or other portable electronic device. Security of financial transactions is an ongoing concern. For example, one worldwide problem is credit card fraud resulting in monetary losses and identity theft. One particular concern is security at the point where payment is initiated, AKA the Point of Interaction (POI). Examples of POIs include point of sale terminals or a smart-meter systems that access, process and store sensitive data pertaining to financial transactions. POIs may be attended (for example, inside a retail store), or unattended (for example, automotive fuel dispensers, vending machines, parking meters, and Automatic Teller Machines). Some POIs read information from a magnetic strip on a card and additionally require a signature. Some POI's read information from an electronic circuit embedded in a card and may additionally require entry of a Personal Identification Number (PIN). Some POIs read information from a nearby cell phone or other portable electronic device. POIs are vulnerable to a variety of fraudulent actions, for example, addition of external hardware to read a card (skimming), addition of internal electronics to intercept or monitor transactions, or theft and disassembly of a device and then reading sensitive data stored in memory.

The financial payment industry has implemented multiple standards for manufacturers of POI's. In the United States, the Payment Card Industry (PCI) has developed a Data Security Standard (DSS). In Europe, some of the payment industry companies, Europay, MasterCard, and Visa (EMV), have developed a separate set of standards for cards using embedded electronic chips. PCI has a separate set of standards for PIN Transaction Security (PTS). One example security requirement for POI systems is tamper-detection and making the system immediately inoperable upon detection of tampering. In addition, POI systems are required to erase any sensitive data upon detection of tampering. The standards establish goals but they do not specify in detail how the goals must be met. Instead, the payment industry gives POI system manufacturers security criteria to build and test against and the POI system manufacturers have some design freedom in implementing POI's that comply with the security criteria.

DETAILED DESCRIPTION

In the following description, a POI system includes a tamper detection module. If the tamper detection module detects tampering, the tamper detection module is configured to immediately erase memory, even if the rest of the POI system is disabled or destroyed. The tamper detection module is field configurable. That is, the manufacturer of the POI system can program which conditions are monitored, the criteria for determining whether a tamper trigger signal should be initiated, and the action resulting from a tamper trigger signal. Various features of the tamper detection system described herein can be implemented in circuitry, including integrated circuits, or software or both.

The following is an example list of attributes for the tamper detection module:
- Self-contained power supply (battery) and clock.
- Monitoring of enclosure integrity.
- Monitoring of temperature.
- Monitoring of system clocks.
- Programmable enablement of sensors.
- Programmable criteria for determination of tampering.
- Programmable Input/Output (I/O) for external indication of tampering.
- Modification of data in memory to prevent imprinting of static memory.
- Immediate system shutdown and erasure of memory when tampering is detected.
- Non-erasable tamper log memory.

Figure 1:
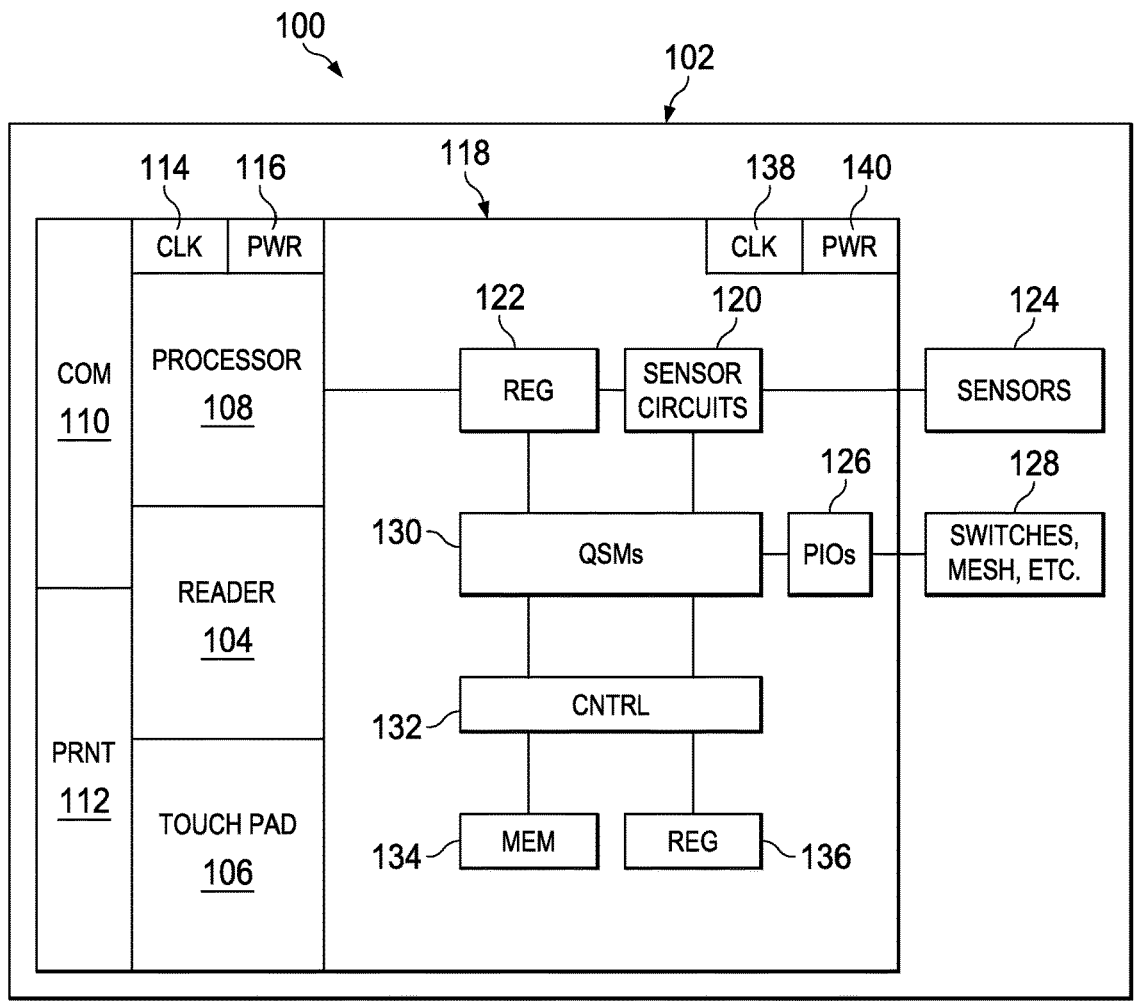
FIG. 1 is a block diagram schematic of an example embodiment of a POI system.

FIG. 1 illustrates an example POI system 100. The POI system 100 is at least partially contained with an enclosure 102. A reader 104 reads financial account information from a magnetic stripe on a card, or from an electronic circuit on a card, or wirelessly from an electronic device (for example, a cell phone) held in close proximity to the reader 104. A touch pad 106 receives information entered manually, for example a PIN or phone number. Alternatively, other personal identification may be acquired, for example, biometric data such as fingerprint scanning, facial recognition, retinal scanning, etc. A processor 108 controls the POI system 100. A communications module 110 sends and receives information outside the POI system 100. For example, the communications module 110 may send account ID and a transaction amount to a payment company and receive transaction approval. The communications module 110 may use, for example, telephone land lines or a wired or wireless network. A printer 112 prints a receipt. If the POI 100 is an Automatic Teller Machine then there will be a cash dispenser (not shown). The POI 100 includes at least one primary system clock 114 and at least one primary system power supply 116. The POI system 100 in FIG. 1 is just an example for illustration and discussion. In some embodiments some logical partitions/blocks/modules may be integrated as part of larger functional units, some functional units may be physically separate, some functional units may not be included, there may be additional functional units that are not illustrated, and partitioning may be different than illustrated.

The example POI system 100 illustrated in FIG. 1 also includes a Tamper Detection Module 118. The Tamper Detection Module 118 comprises a variety of sensor circuits 120 enabled by configuration registers 122. The sensor circuits 120 are coupled to various sensors 124. As will be discussed in more detail below, the sensors 124 monitor temperature, clock frequency, power supply voltages, and other operating conditions. The Tamper Detection Module 118 also includes programmable inputs/outputs (PIOs) 126. As will be discussed in more detail below, the PIOs 126 are coupled to various switches and wire meshes, or other devices used to monitor the status of the enclosure and physical integrity and other system health information (for example, hardware self-test). Outputs of the sensor circuits 120 and PIOs 126 are processed through individually programmable qualifying state machines (QSMs) 130. The QSMs 130 generate trigger signals when certain conditions are met, and the trigger signals are used to initiate programmable actions such as system reset, erasure of memory, etc. The Tamper Detection Module 118 also includes a controller 132, memory 134, and a register bank 136. The Tamper Detection Module 118 also includes an internal clock 138 used for monitoring the primary system clock 114, and also used by the Tamper Detection Module 118 as a backup clock if the primary system clock 114 fails or is disabled. The Tamper Detection Module 118 also includes a battery-backed power supply 140 so that it can continue to operate if the primary system power supply 116 for the POI system 100 fails or is disabled. The POI system 100 stores encrypted sensitive data in the memory 134 and in the register bank 136. The Tamper Detection Module 118 is configured to erase the memory 134 and/or the register bank 136 when certain conditions are met.

The sensors 124 may be separate devices within the enclosure 102, or may be part of functional parts of the POI system 100 (for example, part of the primary system clock 114, or part of the system power supply 116). For example, one or more temperature sensors may monitor temperature within the enclosure 102, other temperature sensors may monitor temperature of the processor 108, a frequency sensor may monitor the frequency of the primary system clock 114, and voltage sensors may monitor voltages from the system power supply 116.

The PIOs 126 can be configured, for example, as switch status detectors, wire mesh pairs (driver/receiver), or circuitry to receive self-test information. The PIOs 126 can be configured to monitor normally open switches or normally closed switches. They can be configured as drivers or as receivers, and to drive with tristate outputs, provide input pull-ups, etc.

The Tamper Detection Module 118 can be configured by the manufacturer of the POI system 100. For example, the configuration registers 122 can be programmed by the manufacturer of the POI system 100 to determine which sensors 124 are used. Preferably, the configuration registers 122 are memory mapped and can be directly accessed by the processor 108. In addition, the QSMs 130 can be programmed by the manufacturer of the POI system 100 to determine when certain conditions are met to generate a trigger signal. In addition, the internal actions resulting from a trigger signal (such as resetting all or part of the system or erasing memory) are programmable. In addition, parts of the POI system 100 not within the Tamper Detection Module 118 may include separate sensors, test circuitry, or tamper detection circuitry, and information from those external sensors and circuits may be sent to the Tamper Detection Module 118 (via programmable PIOs 126) to initiate appropriate action.

As discussed above, the QSMs 130 can be configured by the manufacturer of the POI system 100 to determine when certain conditions are met to generate a trigger signal. One example purpose for programmable conditions is to prevent false trigger signals. Configurable parameters for the QSMs 130 are controlled through the configuration registers 122. In one example embodiment, conditions are sampled periodically by the sensor circuits 120 and PIOs 126. The QSMs 130 may be configured to require multiple detected failures before a trigger signal is generated. For example, QSMs 130 may be configured to operate in one of two modes. A first example mode is a threshold count mode in which a tamper trigger signal is generated when the number of failures exceeds a programmable threshold count. A second example mode combines a programmable timer and a programmable threshold. In the second mode, failures are counted over a programmable time window and a tamper trigger signal is generated when the number of failures exceeds a programmable threshold within the time window. Additional example QSM qualifications for temperature sensing and clock frequency sensing are discussed in more detail below.

One example of monitoring enclosure and physical integrity is monitoring the state of spring loaded switches that can activated by the loosening of screws or removal of other types of fasteners. Another example is detection of continuity of one or more wire meshes placed inside the enclosure or around sensitive hardware.

Figure 2A:
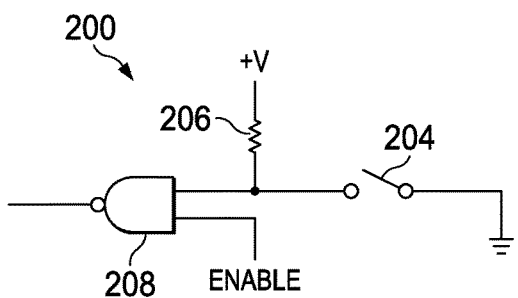
FIG. 2A is a schematic of an example circuit used to monitor enclosure integrity.
Figure 2B:
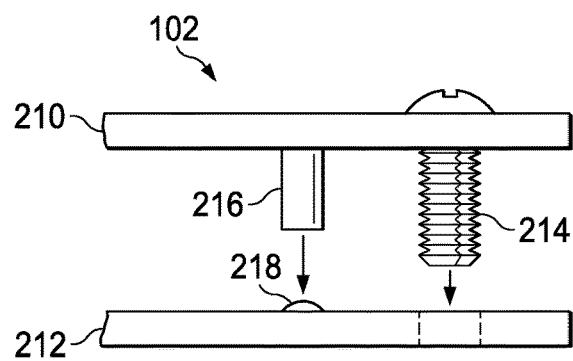
FIG. 2B is cross-section of part of an example embodiment of an enclosure illustrating an example embodiment of a switch illustrated in FIG. 2A.

FIG. 2A is a schematic of an example circuit 200 used to indicate enclosure integrity. A switch 204 is coupled to first input of a NAND gate 208. A pull-up resistor 206 holds the first input of the NAND gate 208 high unless the switch 204 pulls the first input of the NAND gate 208 to ground. A second input of the NAND gate 208 is an ENABLE signal. Switch 204 is an example of switches 128 in FIG. 1. The NAND gate 208 is an example of a PIO 126 in FIG. 1. The ENABLE signal is an example of a signal from configuration registers 122 (FIG. 1) used to configure which switches 128 and which sensor circuits 120 are active. The NAND gate 208 and pull-up resistor 206 are examples of configurability of PIOs 126. As discussed above, PIOs 126 can be configured as drivers or as receivers, and to drive with tristate outputs, provide input pull-ups, etc. FIG. 2B illustrates a cut-away view of part of an example of the POI enclosure 102. In the example of FIG. 2, an exterior portion 210 of the enclosure 102 can be fastened to an interior portion 212 using, a screw 214. In other embodiments other forms of fastening may be used (for example, rivets, clamps, adhesive, etc.). When the enclosure exterior portion 210 is positioned near the enclosure interior portion 212, a tab 216 attached to the exterior portion 210 activates a switch 218 on the inner portion 212. The switch 218 is an example of switch 204 in FIG. 2A. There may be multiple switches positioned within the POI system 100 wherever there is a portion of the enclosure that might be removed. In one example embodiment, switch 218 is a spring-loaded switch that opens when a flexible surface bubbles indicating that the tab 216 is no longer pressing against the surface.

Figure 3A:
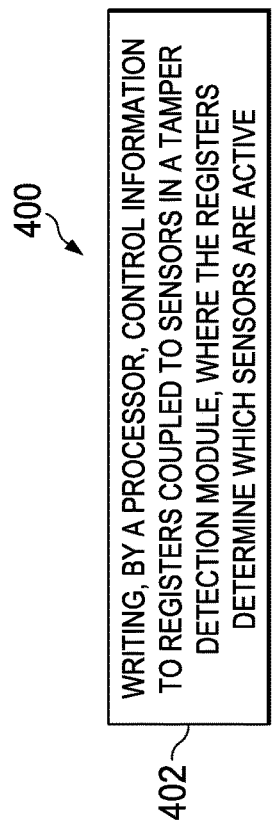
FIG. 3A is a schematic diagram of another example circuit used to monitor enclosure integrity.

FIG. 3A is a schematic diagram of another example circuit 300 used to monitor enclosure integrity. A driver 302 is driven by a pseudo-random signal (PRS). The driver 302 drives one end of a wire mesh 304, which is a continuous conductor fabricated into a serpentine area-filling pattern (illustrated in FIG. 3B). A second end of the wire mesh 304 is coupled to a receiver 306. If an intruder should drill through, cut, or otherwise sever the conductor mesh 304, the connected PIOs 126 in the Tamper Detection Module 118 will detect the breach. The pseudo-random signal assures that an intruder cannot easily bypass the mesh by generating a signal externally. The driver 302 and receiver 306 are examples of configurability of PIOs 126. As discussed above, PIOs 126 can be configured as drivers or as receivers, and to drive with tristate outputs, provide input pull-ups, etc.

Figure 3B:
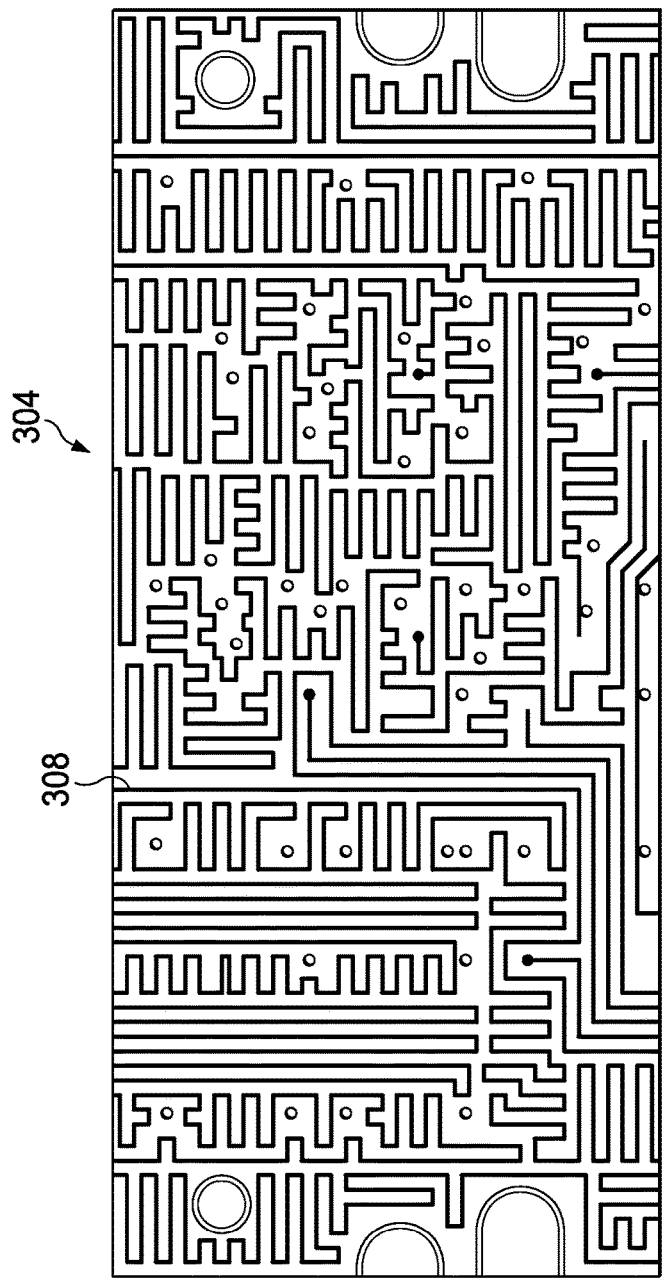
FIG. 3B is a plan view of additional detail for part of an example embodiment of a wire mesh illustrated in FIG. 3A.

FIG. 3B illustrates additional detail for part of the wire mesh 304 of FIG. 3A. As illustrated, a conductor 308 is fabricated into an area-filling serpentine pattern. The wire mesh 304 may be fabricated on a printed circuit board or on a flexible substrate. The area-filling serpentine pattern makes it difficult for an intruder to find a safe place to drill or cut through the mesh.

There may be multiple temperature sensors within the sensors 124 for monitoring temperature at multiple places in the POI system 100. Operating outside the specified temperature range may indicate imminent failure of the processor 108 and the POI system 100 may need to be shut down. Alternatively, operating far outside the specified temperature range may indicate a malicious attempt to disable or destroy the POI system 100 before memory can be erased.

An example configurable QSM 130 for monitoring temperature has a programmable minimum temperature, a programmable maximum temperature, and two programmable percentages. If a monitored temperature is within a first percentage of the programmed minimum or maximum temperatures, then a warning signal is generated by the QSM 130 to give the POI system 100 an opportunity to take action, for example by turning on heating or cooling. If a monitored temperature is more than a second percentage below the programmed minimum temperature, or more than the second percentage above the programmed maximum temperature, then the QSM 130 generates a trigger signal to initiate a higher level response, such as a system shutdown.

The POI system 100 may have multiple primary system clocks 114, multiple tamper detection module internal clocks 138, and there may be multiple sensors within the sensors 124 for monitoring clock frequencies. One example sensor 124 for clock frequency monitoring comprises two counters. One counter counts clock cycles from the primary system clock 114 and a second counter counts clock cycles from the tamper detection internal clock 138 in the tamper detection module 118. Comparing the two counts enables detection of whether the primary system clock 114 is within a specified range. A clock frequency fail event is processed by a QSM 130 to determine whether to generate a tamper trigger signal. As an example, a QSM 130 may generate a tamper trigger signal if two consecutive frequency samples indicate an out-of-range system clock. In the case of a clock frequency tamper trigger signal, the Tamper Detection Module 118 switches to its internal clock 138.

One method of malicious attack is to swamp the electronics with a very high-frequency electromagnetic stimulus to attempt to disable the system before memory can be erased. A second example of a sensor 124 for clock frequency monitoring comprises a high speed delay line. The delay line is triggered at one edge of a clock. If the next edge of the clock occurs before the output of the delay line, then the delay line generates a tamper trigger signal indicating that the clock is too fast. The second example clock frequency sensor is faster than the first example clock frequency sensor, but the second example sensor cannot detect low frequency failures.

The Tamper Detection Module 118 includes a register bank 136 for storing critical secure data that is needed to execute transactions. The register bank 136 is divided into two sections, one section that is used to store data and a second section that is used to store scrambling keys. Scrambling is an option that can be enabled via a PIO 126. When scrambling is enabled, data from the processor 108 is logically combined with a scrambling key using an Exclusive-OR circuit before writing into the register bank 136. For some memory technologies, static memory states can be imprinted (via oxide buildup, incomplete erasure of charge or magnetic field, etc.) so that static values can sometimes be identified after erasure. To prevent static imprinting, data in the register bank 136 is periodically inverted. The inversion process is transparent to the processor 108 (hardware will always return the correct value).

The memory 134 is divided into two sections, one of which is used to store encrypted sensitive data that is erased in case of a tamper event, and a second non-erasable section that is used to store tamper logs and other debug information for analysis after a tamper event. Tamper logs indicate the last state of the outputs of the sensors 124 just before a trigger signal.

The response to a trigger signal is configurable via input to the controller 132. Responses can be selected from any combination of a list of possible responses. An example list of possible responses includes turning on heating or cooling, issuing an interrupt to the processor 108, rebooting the POI system 100, fast (2-3 clock cycles) erasing the register bank 136 (including the scrambling key register), erasing the memory 134, shutting down the POI system 100, etc. In particular, some tamper trigger signals do not need to result in erasure of memory 134. For example, if the tamper detection module 118 senses that the battery backed power supply 140 has failed, then a reset may be generated that results in erasure of the register bank 136, but memory 134 may not erased. If a self-test (for example, a boundary-scan test of the processor 108) indicates a hardware failure, then the system may be rebooted.

The battery backed power supply 140 within the Tamper Detection Module 118 is normally powered externally by the POI system 100 but the power supply 140 may revert to an internal battery when external power is lost.

Figure 4:
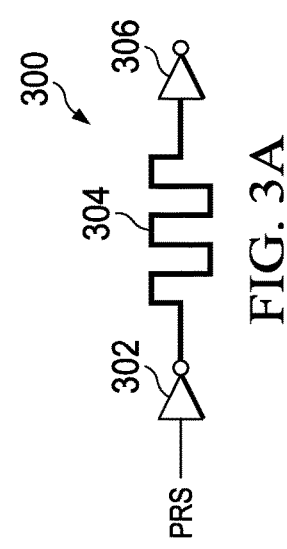
FIG. 4 is a flow chart of an example embodiment of a method for detecting tampering.

FIG. 4 is a flow chart illustrating an example method 400 for configuring a financial transaction system. At step 402, at processor writes control information to registers that are coupled to sensors in a tamper detection module, where the registers determine which sensors are active.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of operating a transaction system, comprising:
   writing, by a processor, control information to registers in a tamper detection module, the tamper detection module coupled to a plurality of sensors, where the control information written to the registers comprises information:
   determining which of the plurality of sensors are active; and
   determining a tamper condition under which a tamper trigger signal is generated;
   using a state machine of the tamper detection module, monitoring one or more active sensors, and, in response to the monitored sensors indicating a tampering condition, generating a tamper trigger signal; and
   responsive to a tamper trigger signal, storing, in a memory circuit, a last state before the tamper trigger signal at the one or more active sensors.

2. The method of claim 1, wherein the control information indicates a mode of operation of the state machine for the monitoring of the sensors.

3. The method of claim 2, wherein the mode of operation determines whether the monitoring uses a window of time.

4. The method of claim 3, wherein the monitoring of the sensors is performed according to the mode of operation indicated by the control information;
   wherein, responsive to the mode of operation indicating not to use a window of time, the monitoring includes:

counting, using the state machine, a number of failures indicated by a first sensor of the sensors; and generating the tamper trigger signal in response to the number of failures exceeding a threshold.

5. The method of claim 4, wherein the control information indicates the threshold.

6. The method of claim 3, wherein the monitoring of the sensors is performed according to the mode of operation indicated by the control information; and wherein response to the mode of operation indicating to use a window of time, the monitoring includes:

counting, using the state machine, a number of failures indicated by a first sensor of the sensors within the window of time; and generating the tamper trigger signal in response to the number of failures within the window of time exceeding a threshold.

7. The method of claim 6, wherein the control information indicates a duration of the window of time and the threshold.

8. The method of claim 1, further comprising:

taking an action in response to the tamper trigger signal, wherein the control information indicates an attribute of the action.

9. A system comprising:

a processor;

a set of registers coupled to the processor;

a state machine coupled to the set of registers; and a memory circuit coupled to the state machine, wherein:

the system is operable to couple to a set of sensors;

the processor is operable to write control information to the set of registers, the control information comprising information that specifies a subset of the set of sensors that is enabled, and information that specifies a tampering condition under which a tamper trigger signal is generated;

the state machine is operable to monitor the subset of the set of sensors according to the control information and in response to the monitored sensors indicating a tampering condition, generate a tamper trigger signal; and the system is operable to, in response to the tamper trigger signal, store, in the memory circuit, a last state before the tamper trigger signal.

10. The system of claim 9, wherein the set of registers is memory mapped to the processor.

11. The system of claim 9, wherein the control information indicates a mode of operation of the state machine for the monitoring of the subset of the set of sensors.

12. The system of claim 11, wherein the mode of operation indicates whether the state machine uses a window of time in the monitoring of the subset of the set of sensors.

13. The system of claim 12, wherein, when the mode of operation indicates not to use the window of time, the state machine is operable to monitor the subset of the set of sensors by:

counting a number of failures indicated by a first sensor of the subset of the set of sensors; and generating the tamper trigger signal in response to the number of failures exceeding a threshold.

14. The system of claim 13, wherein the control information indicates the threshold.

15. The system of claim 12, wherein, when the mode of operation indicates to use the window of time, the state machine is operable to monitor the subset of the set of sensors by:

counting a number of failures indicated by a first sensor of the subset of the set of sensors within the window of time; and generating the tamper trigger signal in response to the number of failures within the window of time exceeding a threshold.

16. The system of claim 15, wherein the control information indicates a duration of the window of time and the threshold.

17. The method of claim 1, wherein:

the tamper detection module includes a programmable input/output coupled to the registers and configured to couple to a switch; and the control information written to the registers comprises information determining whether the registers provide an enable signal to the programmable input/output.

18. The system of claim 9, wherein:

the system further comprises an input/output circuit operable to couple to a switch;

the control information further comprising information that specifies whether the set of registers provide an enable signal to the input/output circuit; and the input/output circuit includes a NAND gate that includes a first input operable to couple to the switch and a second input coupled to the set of registers to receive the enable signal.

* * * * *